(12) United States Patent
Geipel et al.

(10) Patent No.: US 11,274,609 B2
(45) Date of Patent: Mar. 15, 2022

(54) BURNER FOR A GAS TURBINE AND METHOD FOR OPERATING THE BURNER

(71) Applicant: Siemens Aktiengesellschaft, Munich (DE)

(72) Inventors: Philipp Geipel, Finspong (SE); Annika Lindholm, Finspong (SE); Rikard Magnusson, Kimstad (SE); Arturo Manrique Carrera, Finspong (SE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 16/957,237

(22) PCT Filed: Feb. 6, 2019

(86) PCT No.: PCT/EP2019/052852
§ 371 (c)(1),
(2) Date: Jun. 23, 2020

(87) PCT Pub. No.: WO2019/179691
PCT Pub. Date: Sep. 29, 2019

(65) Prior Publication Data
US 2020/0408154 A1    Dec. 31, 2020

(30) Foreign Application Priority Data

Mar. 20, 2018   (EP) .................................... 18162841

(51) Int. Cl.
*F02C 9/28*       (2006.01)
*F02C 7/22*       (2006.01)
(Continued)

(52) U.S. Cl.
CPC .................. *F02C 9/28* (2013.01); *F02C 7/22* (2013.01); *F23R 3/005* (2013.01); *F23R 3/28* (2013.01); *F23R 2900/00013* (2013.01)

(58) Field of Classification Search
CPC ........... F05D 2260/96; F05D 2260/964; F05D 2270/14; F23D 2210/00; F23N 2241/20;
(Continued)

(56) References Cited

U.S. PATENT DOCUMENTS

2004/0011051 A1* 1/2004 Ryan .......................... F02C 9/28
60/773
2005/0107942 A1    5/2005 Nomura et al.
(Continued)

FOREIGN PATENT DOCUMENTS

JP         2003293793 A    10/2003

OTHER PUBLICATIONS

PCT International Search Report and Written Opinion of International Searching Authority dated May 14, 2019 corresponding to PCT International Application No. PCT/EP2019/052852 filed Jun. 2, 2019.

*Primary Examiner* — Scott J Walthour

(57) ABSTRACT

A burner with a control unit, a combustion chamber, a pressure sensor and fuel stages which are arranged to supply fuel with a respective mass flow to the combustion chamber, wherein the mass flows are controlled by the control unit, wherein the pressure sensor is adapted to measure a pressure sequence in the combustion chamber or in the burner and to transfer the pressure sequence to the control unit which is adapted to perform a Fourier transformation on at least one determined timespan of the pressure sequence to result in a pressure spectrum having a maximum within a frequency band and wherein the control unit is adapted to perform a comparison of the maximum with a predefined threshold and to control the mass flows by using the comparison to reduce and/or to control pressure fluctuations in the combustion chamber.

14 Claims, 3 Drawing Sheets

(51) Int. Cl.
*F23R 3/00* (2006.01)
*F23R 3/28* (2006.01)

(58) Field of Classification Search
CPC .. F23R 3/34; F23R 3/343; F23R 3/346; F23R 2900/00013
See application file for complete search history.

(56) References Cited

U.S. PATENT DOCUMENTS

2014/0200721 A1  7/2014  Rizkalla et al.
2015/0204760 A1* 7/2015  Bottcher ............... G01M 15/14
                                                73/112.01

* cited by examiner

BURNER FOR A GAS TURBINE AND METHOD FOR OPERATING THE BURNER

CROSS REFERENCE TO RELATED APPLICATIONS

This application is the US National Stage of International Application No. PCT/EP2019/052852 filed 6 Feb. 2019, and claims the benefit thereof. The International Application claims the benefit of European Application No. EP18162841 filed 20 Mar. 2018. All of the applications are incorporated by reference herein in their entirety.

FIELD OF INVENTION

The invention relates to a burner for a gas turbine and a method for operating the burner.

BACKGROUND OF INVENTION

A burner for a gas turbine is conventionally designed for specific operating conditions like a specific fuel composition and a specific fuel pressure. If the conventional gas turbine is operated at the specific operating conditions, for which the gas turbine and the burner were conventionally designed, emissions of the gas turbine and the operational availability of the gas turbine are in its planned range.

But during the operation of the gas turbine in the field the specific operation conditions can vary in different ranges. An ambient temperature for example can vary from −50° C. to +50° C., or properties of the fuel like the fuel pressure, the fuel temperature, the fuel composition or the fuel quality can change or vary during the operation of the gas turbine.

It is known that varying operating conditions can lead to problematic operating conditions for combustion. The problematic operating conditions can result in pressure fluctuations in the combustion chamber. Such pressure fluctuations can occur very fast and can be difficult to detect and should be reduced to ensure safe operation of the burner.

To solve this problem the publication US 2014200721 A1 and further the US 2005107942 A1 describes a method to control a gas turbine with a combustion chamber, a control unit and a pressure sensor, whereby the pressure sensor is adapted to measure a pressure sequence over a time period in the burner and to transfer the sequence to the control unit. The control unit preforms a Fourier transformation on the pressure sequence to result in a pressure spectrum. A maximum of the pressure spectrum is compared with a predefined threshold to control the mass flow.

Even if the known solutions enable a control of the mass flow according pressure fluctuations, undesirable effects can occur with a superfluous control action, if in particular incidences with a maximum of the pressure sequence above the threshold appear but which doesn't reflect the real combustion condition.

SUMMARY OF INVENTION

It is an object of the present invention to provide a burner and a method for operating the burner, wherein pressure fluctuations in the combustion chamber of the burner can be reduced and/or controlled.

The object is solved with the features of the independent claims. Advantageous embodiments thereto are given in the further patent claims.

The burner according to the invention comprises a control unit, a combustion chamber, a pressure sensor and fuel stages which are arranged to supply fuel with a respective mass flow to the combustion chamber, wherein the mass flows are controlled by the control unit, wherein the pressure sensor is adapted to measure a pressure sequence in the combustion chamber or in the burner and to transfer the pressure sequence to the control unit which is adapted to perform a Fourier transformation on at least one determined timespan of the pressure sequence to result in a pressure spectrum having a maximum within a frequency band and wherein the control unit is adapted to perform a comparison of the maximum with a predefined threshold and to control the mass flows by using the comparison to reduce and/or to control pressure fluctuations in the combustion chamber.

The method according to the invention for operating a burner comprises a control unit, a combustion chamber, a pressure sensor and fuel stages which are arranged to supply fuel with a respective mass flow to the combustion chamber, wherein the mass flows are controlled by the control unit, the method comprises the steps of: a) supplying the fuel to the combustion chamber and combusting the fuel in the combustion chamber; b) measuring a pressure sequence in the combustion chamber or in the burner using the pressure sensor and transferring the pressure sequence to the control unit; c) performing a Fourier transformation on at least one determined timespan of the pressure sequence to result in a pressure spectrum having a maximum within a frequency band; d) comparing the maximum with a predefined threshold; e) controlling the mass flows by using the comparison of the maximum with the predefined threshold to reduce and/or to control pressure fluctuations in the combustion chamber.

According to the invention it is possible to detect fluctuations in the pressure in the combustion chamber and it is possible to react on the pressure fluctuations caused by problematic operating conditions by adapting the mass flows to ensure to operate the burner with optimal operating conditions. By adapting the mass flows it is thus possible to reduce and/or to control the pressure fluctuations in the combustion chamber.

Signal fluctuations in the pressure sequence, caused by pressure fluctuations in the combustion chamber, can be very low and signal fluctuations, caused by other circumstances in a gas turbine can be very high. Because of that it is possible that the pressure sequence could be easily interpreted wrong which could lead to wrong control orders. According to the invention the control unit is adapted to perform a Fourier transformation on at least one determined timespan of the pressure sequence. The Fourier transformation shows in its frequency domain the amplitude spectrum which has a maximum in a determined frequency band. This ensures that only the pressure fluctuations in the combustion chamber are used to control the mass flows to the combustion chamber. Interference signals can be faded out and will almost not affect mass flows to the combustion chamber. It is thus possible to detect pressure fluctuations in the combustion chamber very reliably which leads to a reliable adaptation of the mass flows by the control unit.

The comparison of the maximum and the predefined threshold shows if the maximum exceeds the predefined threshold or if the maximum does not exceed the predefined threshold. For example, the mass flow of one fuel stage could be increased, if the maximum does not exceed the predefined threshold or the mass flow of another or the same fuel stage could be decreased if the maximum exceeds the predefined threshold. The detection of the maximum in the pressure spectrum is a relative simple mathematical operation and to make the comparison of the maximum with the predetermined threshold is also a simple mathematical operation. The simple mathematical operations can be performed by the control unit automatically and fast. It is thus possible to react on fast changing operating conditions by an automatic and thus fast adaptation of the mass flows by the control unit. This helps to reduce and/or to control the pressure fluctuations in the combustion chamber even if the pressure fluctuations occur fast.

It is conceivable that the pressure sequence is measured by using two or more of the pressure sensors.

The inventive control unit of the burner is adapted to perform on a multitude of the determined timespans a Fourier transformation to result in a respective pressure spectrum having a respective maximum within the frequency band, wherein the control unit is adapted to perform the comparison on each of the maxima with the predefined threshold, to count a number of maxima exceeding the threshold within a predetermined number of the timespans. This enables the control unit to control the mass flows further by using the number of maxima exceeding the threshold. This creates the possibility to take a longer time range into account for controlling the mass flows to the combustion chamber. It is thus possible to reduce the probability of wrong control orders caused by a malfunction of a part of the burner which could affect the control unit. Because of that it is possible to reduce and/or to control the fluctuations of the pressure in the combustion chamber more reliably.

By using two or more determined timespans of the pressure sequence it is also possible to determine a possible development of a following maximum. It can be possible to make predictions of the following maximum before the corresponding timespan of the pressure sequence is evaluated. This creates an opportunity to reduce and/or to control the pressure fluctuations even more reliably in the combustion chamber by using the development of the maxima. This helps to control the mass flows in a very fast and safe manner and to avoid problematic operating conditions.

It is advantageous that the fuel stages comprise a pilot fuel stage and a main fuel stage. The pilot fuel stage is generally used to light the fuel supplied to the combustion chamber via the main fuel stage and/or other fuel stages. The main fuel stage could comprise different fuel stages which supply fuel to the combustion chamber at different positions of the combustion chamber. An overall supplied fuel to the combustion chamber is the sum of the supplied fuel via the pilot fuel stage, the main fuel stage and/or other fuel stages. It is possible that the control unit is adapted to change the mass flows supplied to the combustion chamber via the pilot fuel stage and/or via the main fuel stage. It is conceivable that the pilot fuel stage comprise different fuel stages at different positions of the combustion chamber.

It is advantageous that the control unit is adapted to increase the mass flow of the pilot fuel stage when the number exceeds a first threshold number. Such adaptations by the control unit can reduce the pressure fluctuations. Alternatively or in addition to this, a plurality of the main fuel stages is provided and the distribution of the mass flows of the different main fuel stages is changed when the number exceeds the first threshold number.

It is advantageous that the control unit is adapted to decrease the mass flow of the pilot fuel stage when the number is below a second threshold number. Thereby, the nitrogen oxide concentration in the exhaust gas can advantageously be reduced. It is thus possible to reduce and/or to control the pressure fluctuations and to reduce the nitrogen oxide concentration in the exhaust gas of the burner at the same time.

It is advantageous that the control unit is adapted to control the mass flows of at least one of the fuel stages different from the pilot fuel stage such that the overall power of the combustion of the fuel within the combustion chamber remains constant. The overall power depends at least of the mass flows of the fuel supplied to the combustion chamber and the type of the fuel supplied to the combustion chamber. This creates the possibility to reduce and/or to control the pressure fluctuations while keeping the overall power of the combustion constant.

It is advantageous that the control unit comprises a characteristic line describing the mass flow of at least one of the fuel stages in dependence of an engine parameter of the burner and/or an ambient condition of the burner, wherein the control unit is adapted to shift at least a range of the characteristic line when altering the mass flow of the at least one of the fuel stage. The engine parameter can be for example a gas turbine load, a fuel temperature, an emission value or a fuel pressure. The ambient condition can be for example an ambient temperature, an ambient pressure or an ambient humidity. The characteristic line can for example describe the mass flow of the pilot fuel stage or a ratio that includes the mass flow of the pilot fuel stage and at least the mass flow of one of the other fuel stages. It is possible that the control unit uses different characteristic lines for the different fuel stages and/or for the different engine parameters and/or for the different ambient conditions. It is also possible that the characteristic line describes the mass flow in dependence of a multitude of engine parameters of the burner and/or a multitude of ambient conditions of the burner. By shifting the characteristic line or the relevant range of the characteristic line it is possible to react on the pressure fluctuations in the combustion chamber and thus to reduce and/or to control the pressure fluctuations in the combustion chamber very reliable over a broad range of the operating conditions.

It is advantageous that the control unit has stored an initial characteristic line and is adapted to set the characteristic line back to the initial characteristic line, if the control unit detects a signal failure or a hardware failure. The initial characteristic line can be stored in the control unit during a manufacturing of the burner or during an installation of the burner at a construction site. If, for example, the characteristic line is altered due to a hardware failure of the pressure sensor, the burner could be operated with the problematic operating conditions. Control loops or other mechanisms could be used to detect the failure and the control unit can set the characteristic line back to the safe initial characteristic line.

It is advantageous that the fuel supplied to the combustion chamber via one of the fuel stages and the fuel supplied to the combustion chamber via another one of the fuel stages are identical or different. The fuels can be for example a liquid fuel or a gaseous fuel. The liquid fuel could be for example oil or its products like kerosene or diesel and the gaseous fuel can be for example natural gas or ammonia gas. If different fuels are supplied to the combustion chamber, the fuel supplied via the pilot fuel stage could be for example gaseous and the fuel supplied via the main fuel stage could be for example liquid. It is possible that the burner is adapted to combust different types of fuel at the same time and/or to change the shares of the different types of fuel during the operation of the burner. Each of the different fuels has a calorific value and to keep the overall power of the supplied fuel constant or to control the overall power it is necessary to know the calorific value and the respective mass flow of each supplied fuel. The control unit is adapted to change the mass flows of the different fuels by using the comparison of the maxima with the predefined threshold. It is possible to reduce and/or to control the pressure fluctuations in the combustion chamber by changing the mass flows of the different fuels even if the shares of the different fuels change.

It is advantageous that the pressure sequence comprises a plurality of the determined timespans and the control unit is adapted to calculate a difference between two maxima of two consecutive timespans and to control a velocity of the change of the mass flows and/or a magnitude of the change of the mass flows by using the difference. The consecutive timespans are immediately following each other. For example, a great difference between two maxima of two consecutive timespans indicate that the control unit has to change the velocity of the change of the mass flows and/or the magnitude of the change of the mass flows very fast to avoid pressure fluctuations. If, for example, the difference between two maxima of two consecutive timespans is small, the velocity of the change of the mass flows and/or the magnitude of the change of the mass flows can be changed slowly. In particular, if the timespans are different, a vector between two maxima of two consecutive timespans can be calculated and the vector can be used to control the mass flows. The difference in the amplitude spectrum and a time difference could be used to determine the vector. The time difference can for example be the time from a centre time of a first timespan of the two consecutive timespans to a centre time of a second timespan of the two consecutive timespans.

It is advantageous that the Fourier transformation is a fast Fourier transformation. The fast Fourier transformation is an algorithm for an efficient calculation of the Fourier transformation which uses extensions and can thus save arithmetical calculations. It is possible to save time during the calculation of the maxima and thus to control the mass flows faster. This ensures to avoid operation of the burner with problematic operating conditions and to reduce and/or to control pressure fluctuations faster.

It is advantageous that the burner comprises an emission sensor adapted to determine a nitrogen oxide concentration in the exhaust gas of the burner and to transfer the nitrogen oxide concentration to the control unit which is adapted to determine a maximum mass flow or a minimum mass flow for one of the fuel stages by using the nitrogen oxide concentration. The emission sensor can be arranged in the exhaust gas flow downstream of the combustion. The operating conditions of the burner affect the flame temperature of the combustion and the flame temperature affect the formation of nitrogen oxides. The formation of nitrogen oxides is benefited if the flame temperature is high. An increase in the nitrogen oxide value shows thus an undesired increase in the flame temperature. By adapting the mass flows it is possible to reduce and/or to control the pressure fluctuations and to control and/or reduce the nitrogen oxide concentration. The nitrogen oxide concentration could be used by the control unit for example as a boundary for the maximal mass flow supplied to the combustion chamber via the pilot fuel stage.

It is advantageous that the predefined threshold is determined by using an engine parameter of the burner and/or an ambient condition of the burner. The predefined threshold which is used for the comparison with the maxima can be determined by using the engine parameter of the burner like the turbine load, the fuel composition, the fuel pressure or the fuel temperature. It is possible to determine the determined threshold according to the engine parameters and thus to reduce and/or to control the pressure fluctuations more reliably. Additional it is possible that the ambient conditions can be used to determine the threshold. This creates additionally the possibility to adapt the threshold if at least one of the ambient conditions change and thus to reduce and/or to control the pressure fluctuations. This creates the possibility to reduce and/or to control the pressure fluctuations in the combustion chamber very reliable over a broad range of the operating conditions.

The gas turbine according to the invention comprises at least one of the burners. In this case, the ambient conditions of the burner can be ambient conditions of the gas turbine. In this case, the engine parameters of the burner can be the engine parameters of engine parameters of the gas turbine. It is also possible that a power unit or a power plant comprises one of the burner according to any one of the preceding embodiments.

BRIEF DESCRIPTION OF THE DRAWINGS

The above mentioned attributes and other features and advantages of this invention and the manner of attaining them will become more apparent and the invention itself will be better understood by reference to the following description of embodiments of the invention taken in conjunction with the accompanying drawings, wherein.

DETAILED DESCRIPTION OF INVENTION

Figure 1:
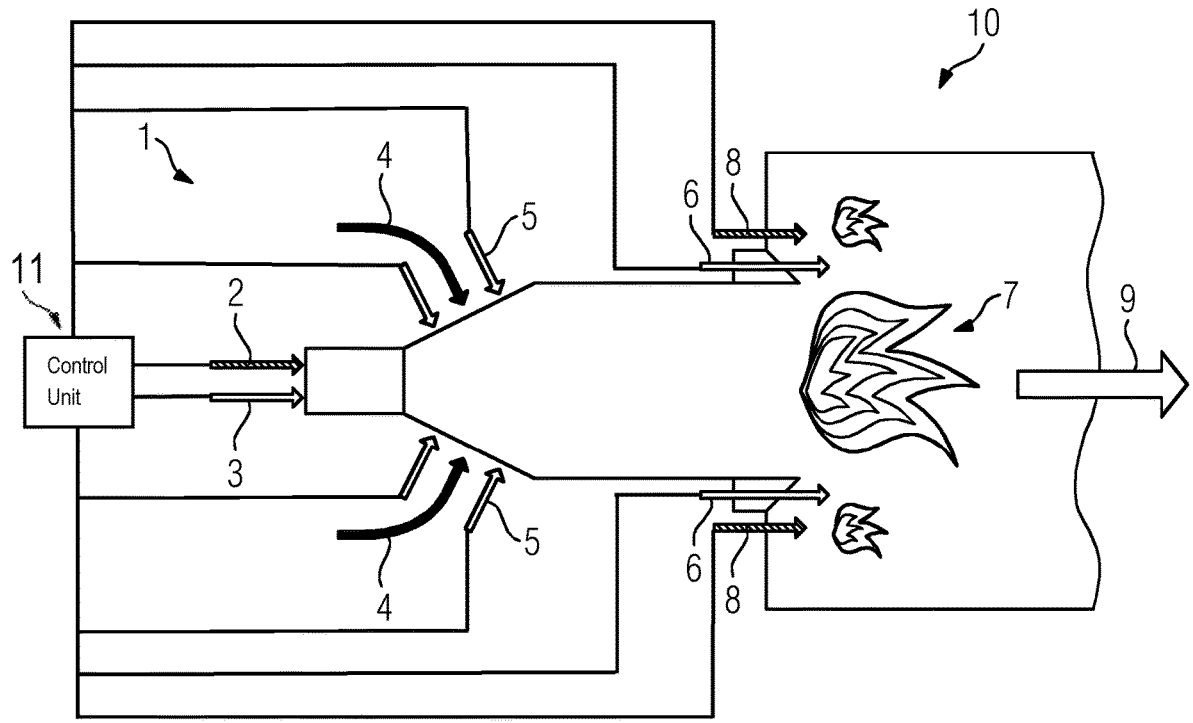
FIG. 1 shows a schematic drawing of a burner.

FIG. 1 shows a burner 1 with a combustion chamber 10, a control unit 11 and fuel stages 2, 3, 5, 6, 8. The fuel stages 2, 3, 5, 6, 8 supply fuel to the combustion chamber 10. The fuel stages 2, 3, 5, 6, 8 are a first liquid fuel stage 2, a first gaseous fuel stage 3, a second gaseous fuel stage 5, a third gaseous fuel stage 6 and a second liquid fuel stage 8. Liquid fuel is supplied to the combustion chamber 10 via the liquid fuel stages 2, 8 and gaseous fuel is supplied to the combustion chamber 10 via the gaseous fuel stages 2, 5, 6. Compressed air 4 is also supplied to the combustion chamber 10. The compressed air 4 is combusted in the combustion chamber 10 together with the fuels. A flame 7 drawn in FIG. 1 represents the combustion and an arrow 9 represents a main flow direction in the combustion chamber 10. The control unit 11 is adapted to control the supply of fuel to the combustion chamber 10 via at least one of the fuel stages 2, 3, 5, 6, 8. The control unit 11 is adapted to control the mass flows of the fuel to the combustion chamber 10 by using a pressure sequence 14 which shows the pressure in the combustion chamber 10. For measuring the pressure sequence, at least one pressure sensor can be placed inside the combustion chamber 10. Alternatively or in addition to this, the pressure sequence shows the pressure in the burner 1. In this case the at least one pressure sensor can be arranged outside from the combustion chamber 10, in particular on a wall confining the combustion chamber 10. A plurality of the pressure sensors can be provided, wherein the pressure sensors are arranged circumferentially around the combustion chamber 10.

Figure 2:
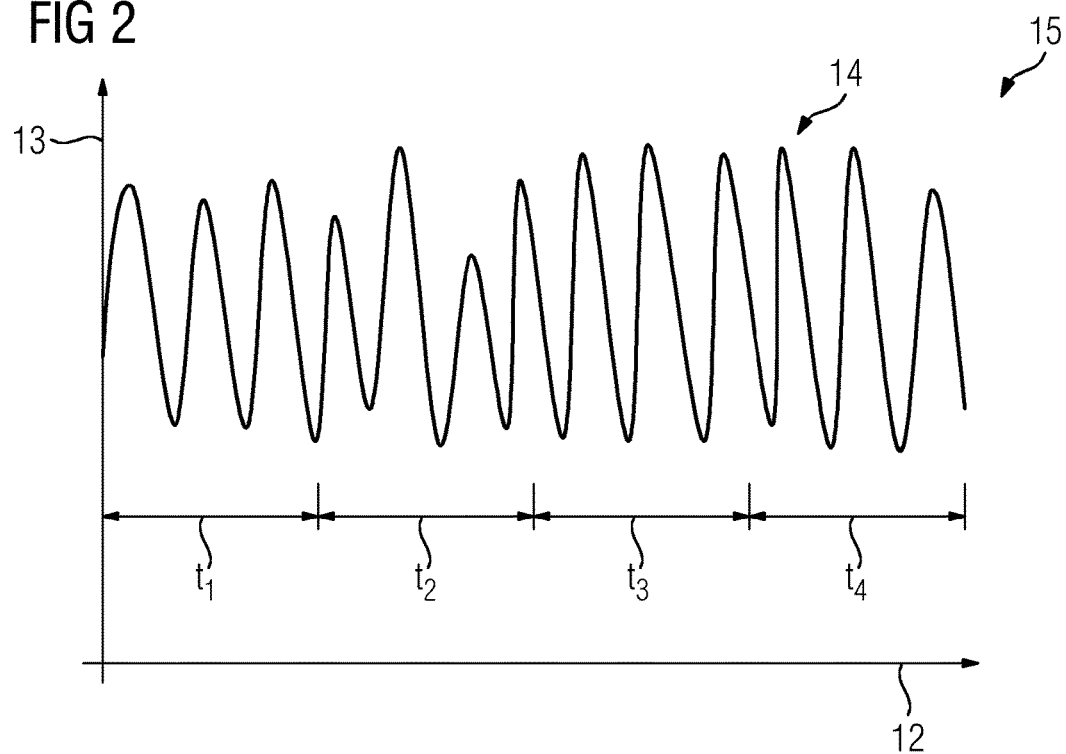
FIG. 2 shows a schematic diagram of a pressure sequence.

FIG. 2 shows a pressure diagram 15 with a time axis 12 and a pressure axis 13. The pressure diagram 15 shows the pressure in the combustion chamber 10 over the time, represented by the pressure sequence 14. FIG. 2 shows additional timespans t1, t2, t3, t4 which can be used to divide the pressure sequence 14 in timely different parts. FIG. 2 shows that the timespans t1, t2, t3, t4 are located immediately after each other. Alternatively, it is conceivable that the timespans t1, t2, t3, t4 overlap or that there are gaps between consecutive timespans t1, t2, t3, t4. FIG. 2 shows the pressure sequence 14 in its time domain before a Fourier transformation.

Figure 3:
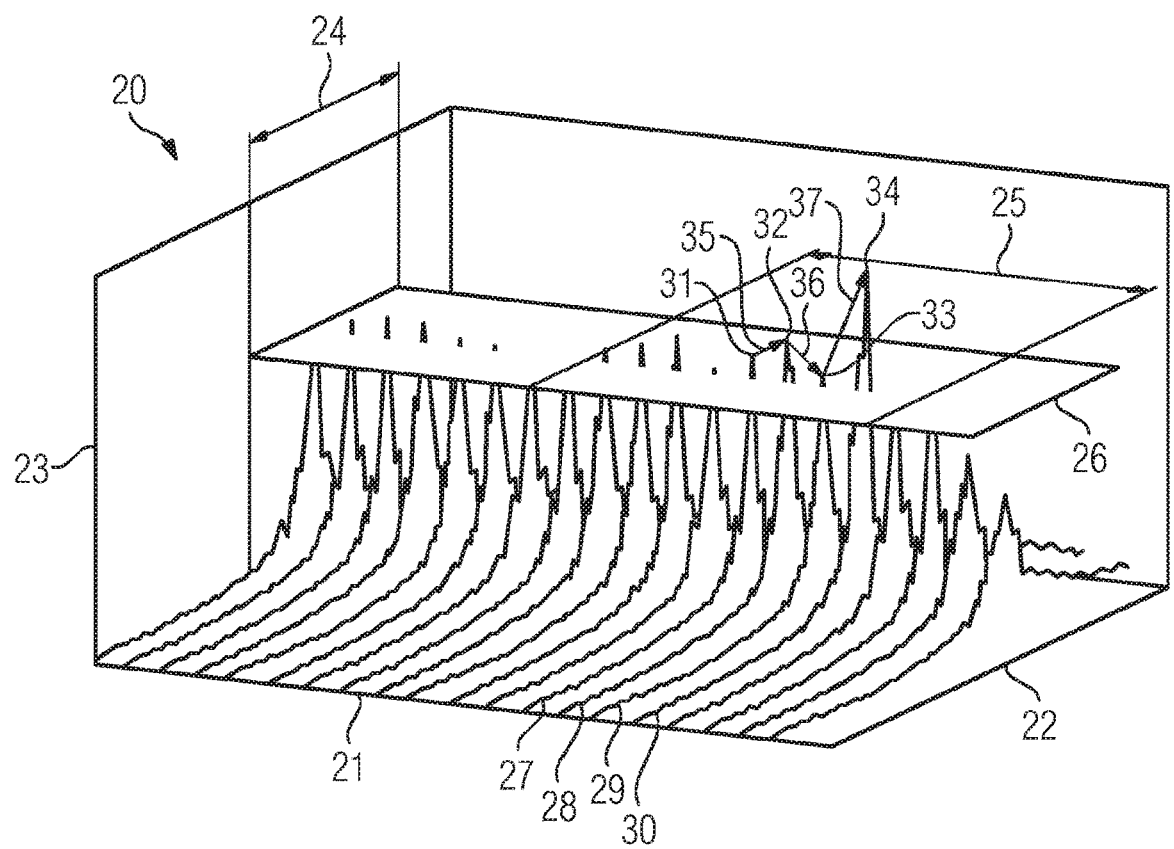
FIG. 3 shows a schematic diagram of a multitude of pressure spectra.

FIG. 3 shows a pressure evolution diagram 20 with a time axis 21, a frequency axis 22 and an pressure amplitude axis 23. Additionally a frequency band 24, a determined threshold 26 and a time range 25 are presented. The pressure evolution diagram 20 shows different pressure spectra 27, 28, 29, 30 after the Fourier transformation of the pressures sequence 14 of the corresponding timespans t1, t2, t3, t4 in the frequency domain. Each of the pressure spectra 27, 28, 29, 30 has a respective maximum 31, 32, 33, 34 within the frequency band 24. A first pressure spectrum 27 has a first maximum 31, a second pressure spectrum 28 has a second maximum 32, a third pressure spectrum 29 has a third maximum 33 and a fourth pressure spectrum 30 has a fourth maximum 34. The pressure spectra 27, 28, 29, 30 are arranged in the pressure evolution diagram 20 along the time axis 21. The pressure evolution diagram 20 shows that some of the maxima 31, 32, 33, 34 exceed the determined threshold 26 and that some of the maxima 31, 32, 33, 34 are below the determined threshold 26. The control unit 11 is adapted to use a comparison of at least one of the maxima 31, 32, 33, 34 with the determined threshold 26 to control the mass flows via at least one of the fuel stages 2, 3, 5, 6, 8 to the combustion chamber 10.

The amplitude spectrum diagram 20 shows additionally a first vector 35 pointing from the first maximum 31 to the second maximum 32, a second vector 36 pointing from the second maximum 32 to the third maximum 33 and a third vector 37 pointing from the third maximum 33 to the fourth maximum 34. Each vector 35, 36, 37 is determined by the difference of the respective two maxima 31, 32, 33, 34 and the time duration of one of the timespans t1, t2, t3, t4. It is conceivable that the control unit 11 is adapted to calculate the vector 35, 36, 37 between two of the maxima 31, 32, 33, 34 and to control a velocity of the change of the mass flows and/or a magnitude of the change of the mass flows by using the vector 35, 36, 37.

Figure 4:
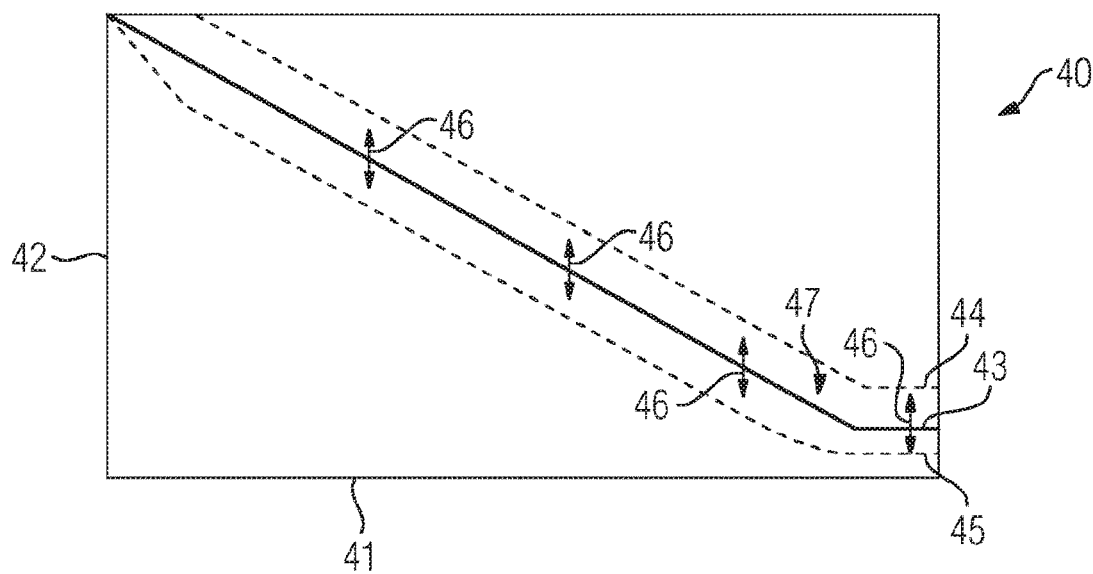
FIG. 4 shows a characteristic line diagram.

FIG. 4 shows a characteristic line diagram 40. The characteristic line diagram 40 shows a mass flow 42 of fuel supplied via one of the fuel stages 2, 3, 5, 6, 8 over an engine parameter 41 of the burner 1, for example the mass flow of the pilot fuel stage over a gas turbine load. It is conceivable that the characteristic line diagram 40 shows a ratio of mass flows, for example the mass flow of the pilot fuel stage to the mass flow of the main fuel stage. The engine parameter 41 of the burner 1 can be for example a gas turbine load, a fuel temperature, an emission value or a fuel pressure. An upper boundary 44 and a lower boundary 45 limit an operational envelope 47 in which the characteristic line 43 can be located. It is possible that the upper boundary 44 or that the lower boundary 45 is determined by using an emission value. If, for example, the characteristic line diagram 40 shows the ratio of the mass flow of the pilot fuel stage to the mass flow of another of the fuel stages 2, 3, 5, 6, 8, the upper boundary 44 can be determined by a maximal nitrogen oxide concentration in the exhaust gas. The control unit 11 is adapted to alter at least a range of the characteristic line 43 by using the comparison of at least one of the maxima 31, 32, 33, 34 with the predetermined threshold 26. Arrows 46 show possible altering directions of the characteristic line 43.

Figure 5:
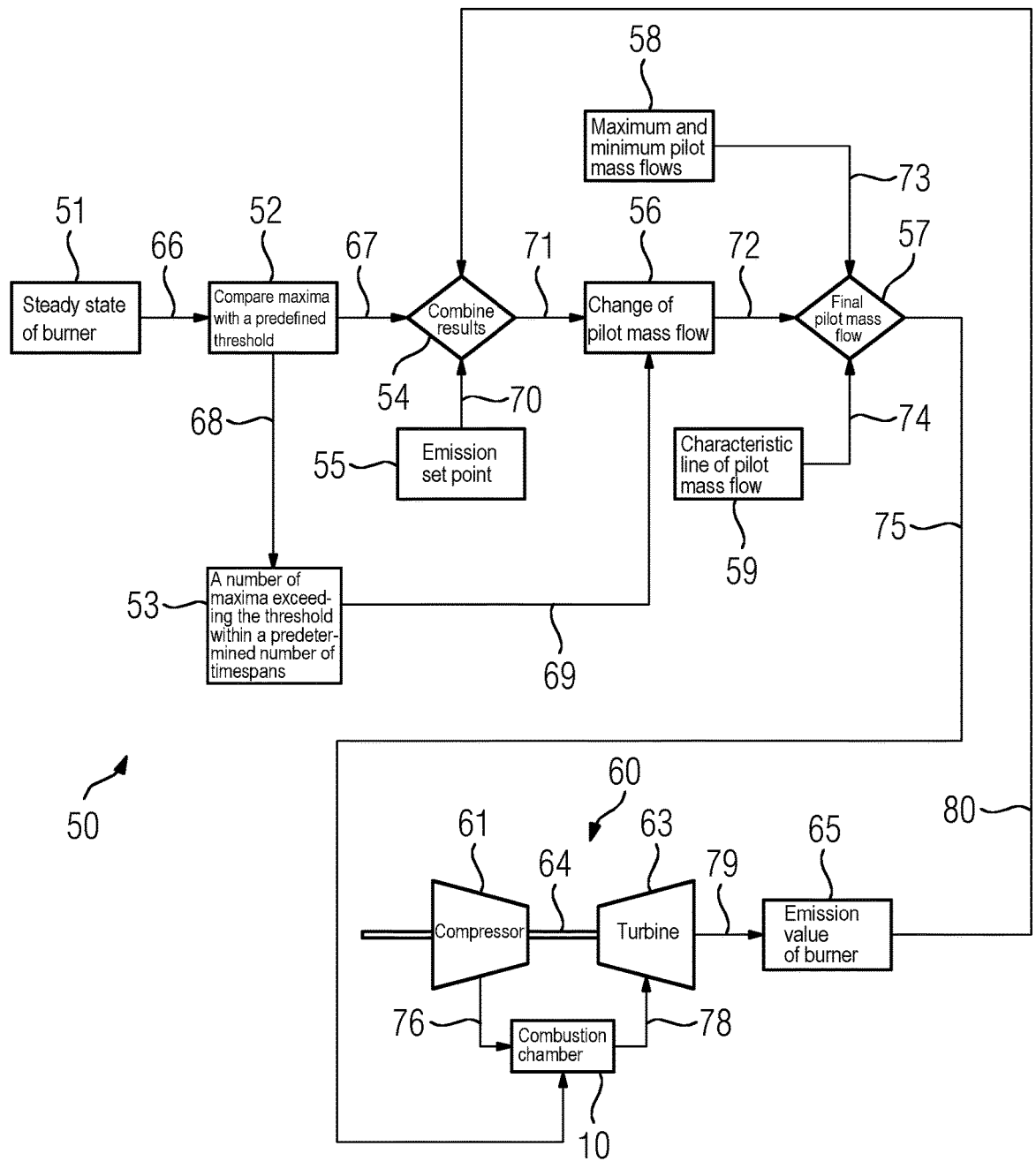
FIG. 5 shows a flow chart.

FIG. 5 shows a flow chart 50 of a possible operating program of the burner 1. The operating program can be implemented in the control unit 11. The flow chart 50 uses a first element 51 to indicate a steady state of the burner 1, a second element 52 to indicate maxima comparing, a third element 53 to indicate counting a number of timespans, a fourth element 54 to indicate a combination of results, a fifth element 55 to indicate an emission set point, a sixth element 56 to indicate a change of the pilot mass flow, a seventh element 57 to indicate a final pilot mass flow, an eight element 58 to indicate a pilot mass flow maximum and a pilot mass flow minimum, a ninth element 59 to indicate a pilot characteristic line and a tenth element 65 to indicate an emission value of the burner 1.

The elements are linked together which is represented via arrows. A first arrow 66 points from the first element 51 to the second element 52, a second arrow 67 points from the second element 52 to the fourth element 54, a third arrow 68 points from the second element 52 to the third element 53, a fourth arrow 69 points from the third element 53 to the sixth element 56, a fifth arrow 70 points from the fifth element 55 to the fourth element 54, a sixth arrow 71 points from the fourth element 54 to the sixth element 56, a seventh arrow 72 points from the sixth element 56 to the seventh element 57, an eight arrow 73 points from the eight element 58 to the seventh element 57, a ninth arrow 74 points from the ninth element 59 to the seventh element 57 and a tenth arrow 75 points from the seventh element 57 to the combustion chamber 10 of a gas turbine 60.

The gas turbine 60 comprises a compressor 61, the combustion chamber 10, a turbine 63 and a shaft 64. The compressor 61 compresses air and the compressed air is supplied to the combustion chamber 10, indicated via an eleventh arrow 76. The combustion chamber 10 combusts the compressed air together with the fuel. Exhaust gas of the combustion is supplied to the turbine 63, indicated via a twelfth arrow 78. The turbine 63 drives the compressor 61 via the shaft 64. Emissions are measured in the exhaust gas of the combustion chamber 10 which is indicated via a thirteenth arrow 79 and a tenth element 65. A fourteenth arrow 80 points from the emission element 65 to the fourth element 54.

The target of the program is to determine the final pilot mass flow (element 59) and to control the burner 1 accordingly (arrow 75). The final pilot mass flow depends on the pilot characteristic line of the pilot mass flow (element 59 and arrow 74) and on the pilot mass flow maximum and the pilot mass flow minimum (element 58 and arrow 73). The final pilot mass flow is determined by using the change of the pilot mass flow (element 56 and arrow 72). The change of the pilot mass flow depends on a number of maxima 31, 32, 33, 34 exceeding the determined threshold 26 (element 52 and 54 and arrows 67, 68 and 71) within the predetermined number of the timespans t1, t2, t3, t4 (element 53 and arrow 69) and on the nitrogen oxide concentration in the exhaust gas (element 65 and arrows 79, 80) of the burner 1 in combination with the emission set point (element 55 and arrow 70). The change of the pilot mass flow can be an increase of the pilot mass flow or a decrease of the pilot mass flow. The program starts with the steady state (element 51 and arrow 66).

Although the invention is described in detail by the embodiments herein, the invention is not constrained by the disclosed examples and other variations can be derived by the person skilled in the art, without leaving the extent of the protection of the invention.

The invention claimed is:

1. A method for operating a burner which comprises a control unit, a combustion chamber, a pressure sensor and fuel stages, each fuel stage being arranged to supply fuel with a respective mass flow to the combustion chamber, wherein the mass flows are controlled by the control unit, the method comprising:
   a) supplying the fuel to the combustion chamber and combusting the fuel in the combustion chamber;
   b) measuring a pressure sequence in the combustion chamber or in the burner using the pressure sensor and transferring the pressure sequence to the control unit;
   c) performing a Fourier transformation on a multitude one of determined timespans of the pressure sequence to provide, for each determined timespan, a respective pressure spectrum having a respective maximum within a frequency band;
   d) comparing each of the maxima with a predefined threshold;
   e) counting the number of maxima exceeding the predefined threshold within a predetermined number of the timespans;
   f) controlling the mass flows based on the comparison of each maximum with the predefined threshold and based on the number of maxima exceeding the predefined threshold to reduce and/or to control pressure fluctuations in the combustion chamber.

2. A burner, comprising:
   a control unit,
   a combustion chamber,
   a pressure sensor, and
   fuel stages which are each arranged to supply fuel with a respective mass flow to the combustion chamber,
   wherein the mass flows are controlled by the control unit,
   wherein the pressure sensor is adapted to measure a pressure sequence in the combustion chamber or in the burner and to transfer the pressure sequence to the control unit, wherein the control unit is adapted to perform a Fourier transformation on a multitude of determined timespans of the pressure sequence to provide, for each determined timespan, a respective pressure spectrum having a respective maximum within a frequency band, and
   wherein the control unit is adapted to perform a comparison of each of the maxima with a predefined threshold, to count a number of maxima exceeding the predefined threshold within a predetermined number of the timespans and to control the mass flows based on the comparison and further based on the number of maxima exceeding the predefined threshold to reduce and/or to control pressure fluctuations in the combustion chamber.

3. The burner according to claim 2,
wherein the fuel stages comprise a pilot fuel stage and a main fuel stage.

4. The burner according to claim 3,
wherein the control unit is adapted to increase the mass flow of the pilot fuel stage when the number of maxima exceeding the predefined threshold exceeds a first threshold number.

5. The burner according to claim 4,
wherein the control unit is adapted to decrease the mass flow of the pilot fuel stage when the number of maxima exceeding the predefined threshold is below a second threshold number.

6. The burner according to claim 5,
wherein the control unit is adapted to control the mass flow of at least one of the fuel stages which is different from the pilot fuel stage such that an overall power of the combustion of the fuel within the combustion chamber remains constant.

7. The burner according to claim 2,
wherein the control unit comprises a characteristic line describing the mass flow of at least one of the fuel stages in dependence of an engine parameter and/or an ambient condition of the burner, wherein the control unit is adapted to shift at least a range of the characteristic line when altering the mass flow of the at least one of the fuel stages.

8. The burner according to claim 7,
wherein the control unit has stored an initial characteristic line and is adapted to set the characteristic line back to the initial characteristic line when the control unit detects a signal failure or a hardware failure.

9. The burner according to claim 2,
wherein the fuel supplied to the combustion chamber via one of the fuel stages and the fuel supplied to the combustion chamber via another one of the fuel stages are identical or different.

10. The burner according to claim 2,
wherein the control unit is adapted to calculate a difference between two maxima of two consecutive timespans and to control a velocity of the change of the mass flows and/or a magnitude of the change of the mass flows based on the difference.

11. The burner according to claim 2,
wherein the Fourier transformation is a fast Fourier transformation.

12. The burner according to claim 2,
wherein the burner comprises an emission sensor adapted to determine a nitrogen oxide concentration in an exhaust gas of the burner and to transfer the nitrogen oxide concentration to the control unit, wherein the control unit is adapted to determine a maximum mass flow or a minimum mass flow for one of the fuel stages based on the nitrogen oxide concentration.

13. The burner according to claim 2,
wherein the predefined threshold is determined by using an engine parameter and/or an ambient condition of the burner.

14. A gas turbine, comprising:
at least one burner according to claim 2.

* * * * *